Aug. 31, 1948.

V. BENDIX 2,448,073

MECHANISM FOR CONTROLLING HELICOPTERS
WITH CO-AXIAL ROTORS.

Filed June 27, 1944

INVENTOR.
VINCENT BENDIX

BY
Hogart Geary & Campbell his ATTORNEYS

Patented Aug. 31, 1948

2,448,073

UNITED STATES PATENT OFFICE 2,448,073

MECHANISM FOR CONTROLLING HELICOPTERS WITH COAXIAL ROTORS

Vincent Bendix, Flemington, N. J., assignor to Helicopters, Inc., a corporation of Delaware Application June 27, 1944, Serial No. 542,285

16 Claims. (Cl. 244—17)

This invention relates to improvements in helicopters. It relates particularly to improvements in the control mechanisms for propelling and stabilizing helicopters of the coaxial, counter-rotating type, such as, for example, the helicopter disclosed in my copending application Serial No. 511,408, filed November 23, 1943.

Helicopters of the type disclosed in my application Serial No. 511,408 are characterized by the provision of a rotor unit which includes one or more engines, and a transmission including a pair of concentric tubular driveshafts upon which are mounted the rotors of the helicopter. The rotors are driven in opposite directions and are provided with variable pitch wings by means of which the amount of lift and the torque to which each of the shafts is subjected may be varied whereby the helicopter can ascend, descend and turn. In addition, each of the rotor wings is provided with means for varying the sectional shape of the wings cyclically in order to vary the lift of the wings and their thrust in the plane of rotation or in other words to vary the aerodynamic characteristics of the wings.

Suitable means are provided for varying the sectional shape of the wing, for example, propeller blades that can be projected from and retracted into the wing so that a rowing action can be obtained to propel the helicopter in a desired direction. Also, by varying the extent of projection of the propeller blades and the position of the arc in the circle of rotation during which the propeller blades are projected, the lift of the wings can be varied in order to exert a controlling effect upon the helicopter and to compensate for variation in the air speed of the wings of the rotors.

The present invention has as a principal object the provision of simplified mechanism for controlling the actuation and cyclical movement of the propeller blades.

Another object of the invention is to provide an improved form of mechanism for actuating the propeller blades cyclically which is lighter and includes a smaller number of more readily accessible parts than control mechanisms heretofore devised.

Other objects of the invention will become apparent from the following description of typical forms of control mechanisms hereinafter described.

In accordance with the present invention, a control mechanism for a counter-rotating, coaxial rotor system having means for varying the sectional shape of the wings is provided with cam control rings disposed concentrically about the shafts, said rings being so arranged that their angular relationship can be changed in order to vary controllably the sectional shape of the wings. Inasmuch as the rotors of the system rotate in opposite directions, another cam ring is mounted in spaced relationship to the first pair of control rings and is so coupled with one of the pair of rings that it partakes of parallelism therewith so that a positive control of both of the sets of rotors can be obtained thereby. By mounting the rings exterior of the driveshafts, the control mechanism is rendered more accessible for servicing, is simplified and is reduced in weight.

For a better understanding of the present invention, reference may be had to the accompanying drawings, in which.

Figure 1:
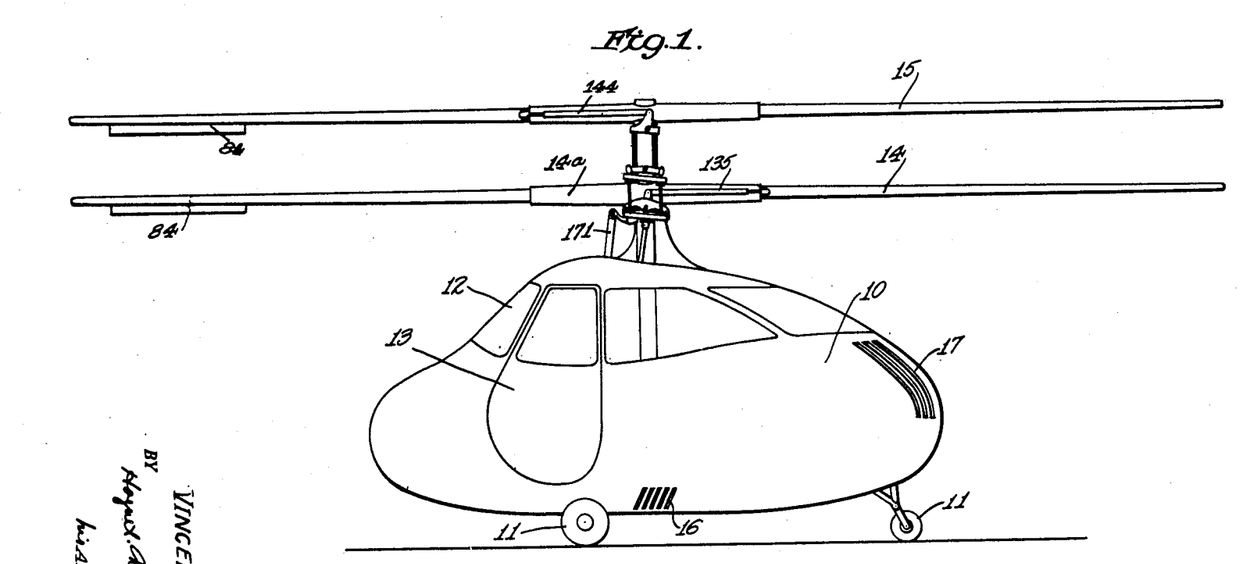
Figure 1 is a view in side elevation of one form of helicopter embodying the present invention.

The form of helicopter chosen for purposes of illustration, and shown particularly in Figure 1, includes a two passenger aerodynamically shaped cabin, body or fuselage 10 which is provided, as shown, with a three-wheel landing gear 11. The body 10 is generally egg-shaped and is provided with a plurality of windows 12 affording visibility in substantially all directions. It will be understood, of course, that the shape and size of the body can be modified as desired.

Near the forward part of the body 10 is provided a door 13 through which the pilot and the passenger can gain access to the interior of the body. Rearwardly of the door 13 and behind the seats is mounted the rotor unit including a motor and a transmission and the shafts for the counter-rotating, coaxial rotors 14 and 15.

Ventilating louvres 16 and 17 are appropriately disposed in the bottom and the rear of the body 10 so that air may be drawn into and exhausted from the rear portion of the body for cooling the engine as will be described hereinafter.

Figure 2:
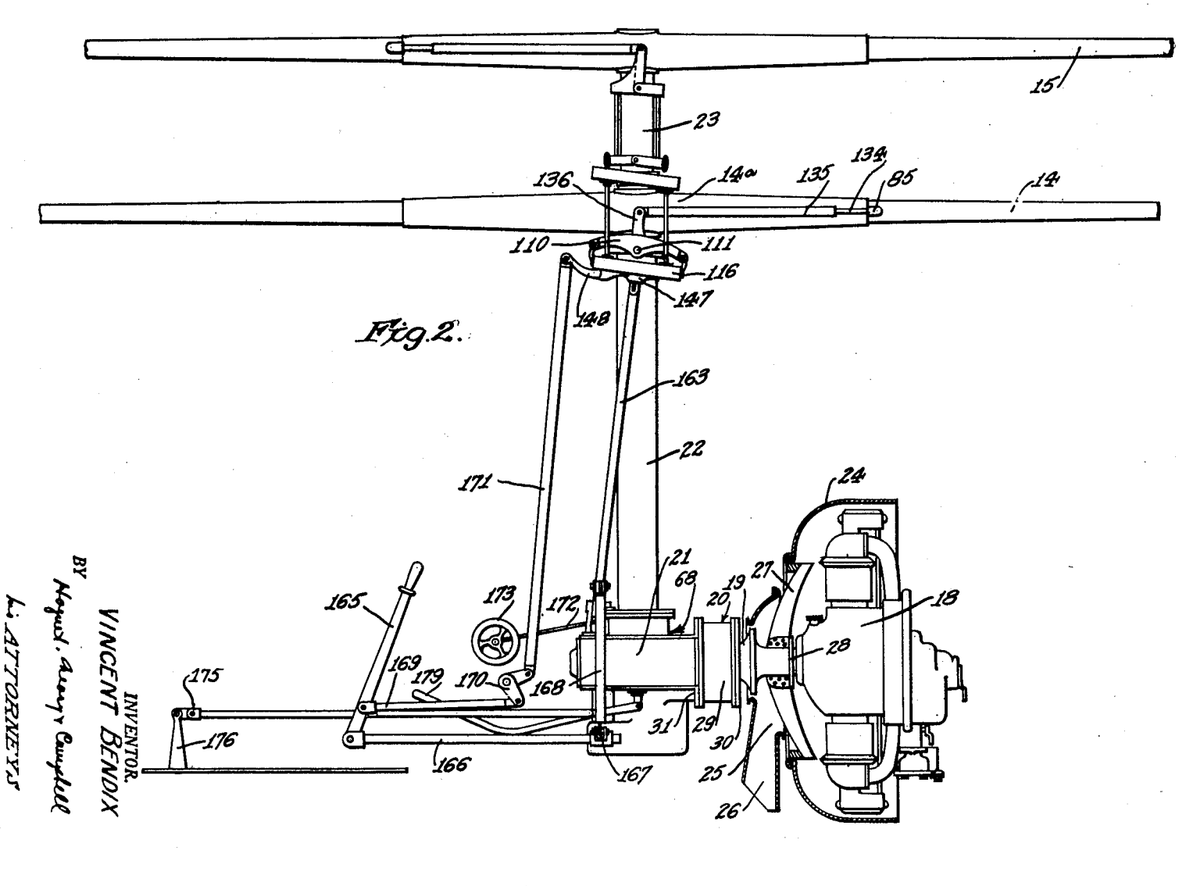
Figure 2 is a diagrammatic view of a typical form of rotor unit illustrating the controls therefor.

Referring now to Figure 2, the rotor unit includes at least one engine 18 that is coupled by means of a universal joint 19 to a gear reduction system 20 and a transmission 21. The transmission is connected by means of the shafts 22 and 23 to the rotors 14 and 15, respectively.

The engine 18 may be enclosed partially in a cowling 24 which opens to the rear of the engine and is provided with an intake opening 25 through which air is drawn from a scoop 26 by means of a blower 27 mounted on the crankshaft 28 of the engine. The intake scoop 26 preferably is aligned with the louvres 16 in the body 10 so that fresh air is drawn into the cowling 24 and is exhausted rearwardly therefrom through the exhaust louvres 17.

Figure 3:
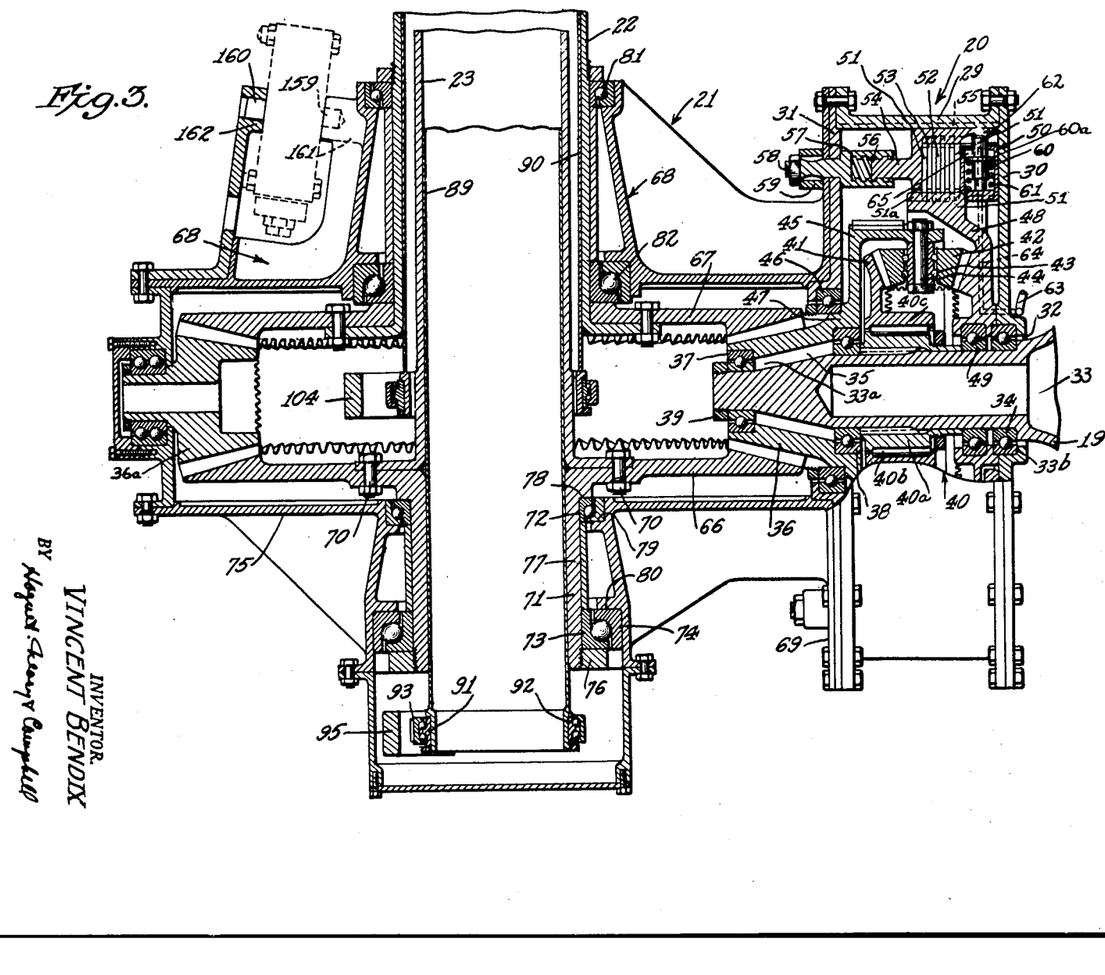
Figure 3 is a view in vertical cross-section and partially broken away of the transmission and gear reduction mechanism of the device.

The reduction gear system 20 and the transmission 21 are shown in greater detail in Figure 3. The reduction gear system 20 includes a cylindrical casing 29 having annular end plates 30 and 31 bolted to its edges to form a drum-like housing. The plate 30 is provided with an opening 32 in its center for receiving the shaft 33 that is connected with the universal joint 19 and delivers power from the engine 18. The shaft 33 is journaled at one end in an anti-friction bearing 34 that is mounted in the opening 32 of the end plate 30. The opposite end of the shaft 33 is provided with a tapered portion 33a which is received within a conical cavity 35 in the interior of a bevel gear member 36. Suitable anti-friction bearings 37 and 38 are interposed between the shaft 33 and the bevel gear member 36 in order to support them concentrically for relative rotation. The shaft 33 is maintained in axially fixed position by means of a shoulder 33b engaging the anti-friction thrust bearing 34 and a nut member 39 threaded on the tapered end 33a engaging the inner race of the thrust bearing 37.

The shaft 33 further carries an overrunning clutch 40, the inner annular section 40a thereof being splined to the shaft 33 for rotation therewith. The overrunning clutch 40 is of a type including locking rollers 40b which cooperate with the outer surface of the element 40a and the inner surface of an annular member 40c which carries a ring gear 41. The overrunning clutch 40 is so arranged that the driveshaft 33 can drive the ring gear in one direction, but the ring gear 41 can overrun the shaft when the shaft 33 slows down or comes to a stop.

The ring gear 41 meshes with a plurality of differential pinions 42 which are supported on anti-friction bearings 43 on stub shafts 44 that are fixed to a drum member 45 which may serve as a brake drum, if desired. The drum member 45, as illustrated, is integral with the bevel gear 36 and is disposed wholly within the casing for the reduction gear. Exterior support for the drum 45 is afforded by an anti-friction bearing 46 interposed between the end plate 31 and a cylindrical portion 47 between the bevel gear 36 and the drum 45.

The differential pinions 42 also cooperate with a gear member 48 that is supported for relative rotation on the shaft 33 by means of the anti-friction bearing 49.

The above-described differential construction is such that upon rotation of the shaft 33, the ring gear 48 and the differential pinions 42 idle without causing rotation of the bevel gear 36. In order to transmit power to the bevel gear 36, a brake mechanism 50 is provided for either slowing down the rotation of the bevel gear 48 or bringing it to a complete stop.

The brake mechanism 50 includes a drum-like, splined portion 51 disposed radially outwardly of and fixed to the bevel gear 48. The portion 51 is provided with a plurality of plates 52 of ring-like form carried by the splines 51a and slidable axially thereof. Cooperating with the plates 52 are the ring plates 53 that are splined to a ring member 54 that is slidably mounted in the interior of the cylindrical casing portion 29 and connected thereto by the splines 55.

In order to cause the plates 52 and 53 to engage and bring the ring gear 48 to a stop, the member 54 is provided with a plurality of threaded shafts 56 which are received in threaded cup-shaped members 57 that are rotatably mounted in the end plate 31. Each cup-shaped member 57 is provided with a shaft 58 on which is mounted a lever 59 for rotating the member 57 to move the clutch plates 53 and 52 together or to separate them. The levers 59 may be interconnected in any suitable way for simultaneous movement.

The above-described construction permits the ring gear 48 to rotate freely when the plates 52 and 53 are disengaged or to impose a drag on the ring gear 48 or prevent its rotation when the plates 52 and 53 are engaged.

As the movement of the ring gear 48 is retarded by the brake 50, the rotation of the bevel gear 36 is increased up to a maximum which, because of the gear reduction system 20, is less than the speed of rotation of the shaft 33.

Any slippage of the brake elements 52 and 53 may be overcome by means of a latch mechanism which positively locks the bevel gear 48 to the casing. This lock may include a plurality of latch pins 60 that are normally urged by means of associated springs 61 into the recesses 62 in the ring member 54. These pins can engage in the ring member 54 only when the plates 52 and 53 are fully engaged. In order to retract the latch pins 60, an oil line 63 is provided that is connected to the oil pump of the engine and communicates with an oil line 64 drilled or otherwise formed in the ring gear 48 and extending up to a chamber 65 in which the lock pin 60 is received. The oil pressure acts on piston flange 60a on the pin 60 to force the pin radially inwardly when oil under sufficient pressure is supplied to the chamber 65. When the oil pressure is reduced, the spring 61 can urge the latch pin 60 into the recess 62 in the ring 54 in order to lock these elements together.

The bevel gear 36 cooperates with a pair of ring gears 66 and 67 which are disposed within the transmission casing 68. Idler gears 36a may be interposed between the ring gears 66 and 67 where desired, or other engines 18, transmission and reduction gear systems connected to the gears 66 and 67 by means of the gear or gears 36a.

The transmission casing 68 is of the banjo-type and has at one end a laterally projecting annular flange 69 that overlies the end plate 31 and is secured thereto. The lower ring gear 66 is secured to the drive-shaft 23, as by means of the bolts 70 and has a downwardly extending sleeve 71 which is supported by the anti-friction thrust bearings 72 and 73, in a casing 74 projecting from the lower plate 75 of the housing 68. The ring gear 66 and the shaft 23 are retained against axial movement by means of a ring 76 threaded on the lower end of the shaft and engaging the inner race of the bearing 73, which in turn engages a sleeve 77 that engages the inner race of the upper bearing 72. This upper race also engages a shoulder 78 on the underside of the ring gear 66. The outer races of the bearings 72 and 73 rest against oppositely facing shoulders 79 and 80 in the housing 74.

The upper ring gear 67 is similarly connected to the driveshaft 22 and is supported by means of anti-friction bearings 81 and 82 in an upwardly extending tubular portion of the casing 68. The shaft 22 and the ring gear 67 are retained against axial movement by suitable retaining ring sleeves and shoulders on the shaft and in the casing 68.

The above-described construction is such that upon operation of the engine 18, the bevel gear 36 is driven at reduced speed and causes rotation of the shafts 22 and 23 in opposite directions. If the engine stops, the rotors are permitted to autorotate by the overrunning clutch 40 in the transmission.

The rotors 14 and 15 are similar in that they each include a hub and two or more variable pitch wings thereon. As shown in Figure 2, the hub 14a is of generally tubular form tapering in opposite directions from its center. The hub 14a receives a tubular spar (Figure 4) 83 in each end, the spar forming the rigidified end supporting element for each wing. The wing construction is similar to that disclosed in my copending application Serial No. 511,408 in that it is of airfoil cross-section and includes a plurality of ribs of appropriate shape covered by a skin of fabric, metal or plywood. Each wing is provided with a propeller blade 84 (Figure 1) which can be rocked from a position lying substantially in the plane of the ring to a position projecting from the wing. As described in my aforesaid application, each of the propeller blades 84 may be projected or retracted by means of a shaft 85 movable axially of the wing parallel to the spar 83 by means of suitable complemental spiral threaded portions thereon.

In order to vary the pitch of the wings of the rotors, each spar 83 of the rotors 15 is provided with a pair of pins or lugs 86, 86' that cooperate with the inclined slots 87 in opposite sides of a tubular sleeve 88 that is movable axially of the shaft 22 or the shaft 23 and is pinned thereto so that relative rotation therebetween cannot take place. The sleeve 88 associated with the rotor 15 is fixed to a tubular shaft 89 which is disposed within the shaft 23, as shown in Figure 3 and terminates below the lower end of the shaft 23. A similar, larger diameter sleeve associated with the rotor 14 is secured to the sleeve shaft 90 that is disposed within the shaft 22, terminating between the ring gears 66 and 67.

Figure 6:
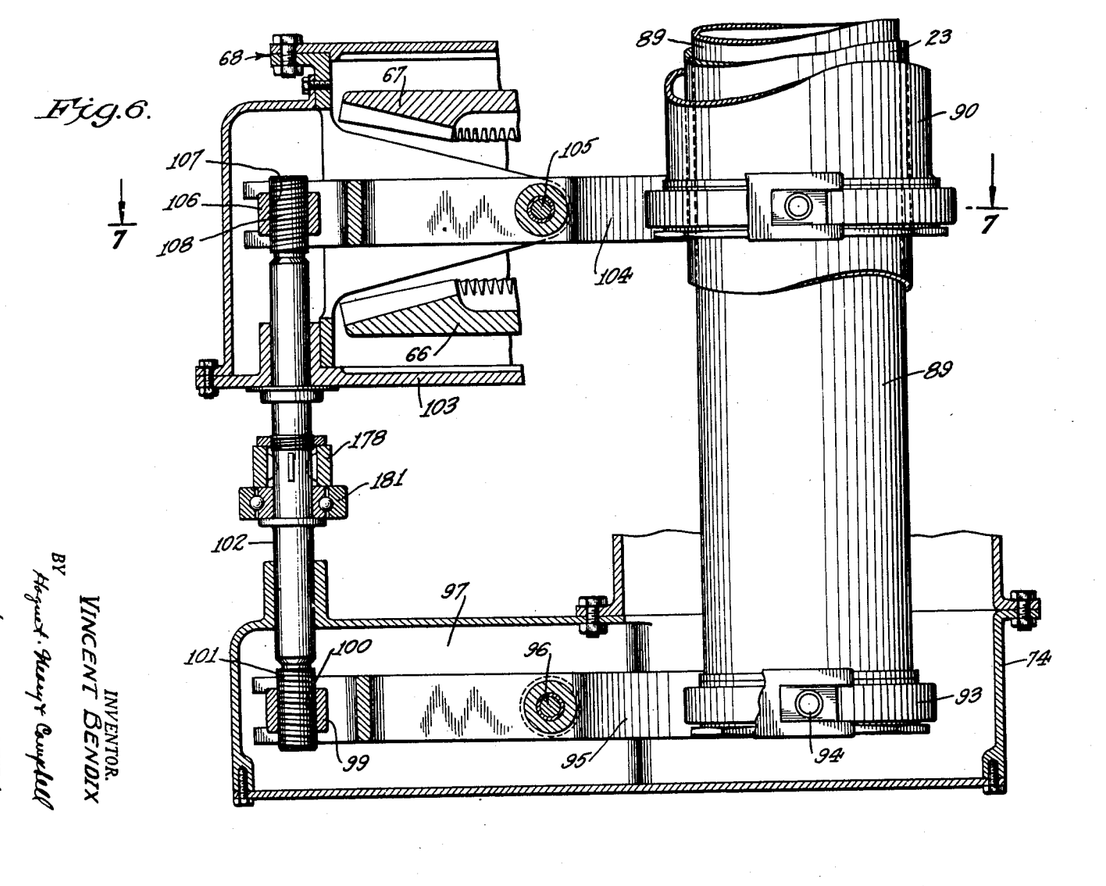
Figure 6 is a view in side elevation and partly in section of the control mechanism for varying the pitch of the rotors.
Figure 7:
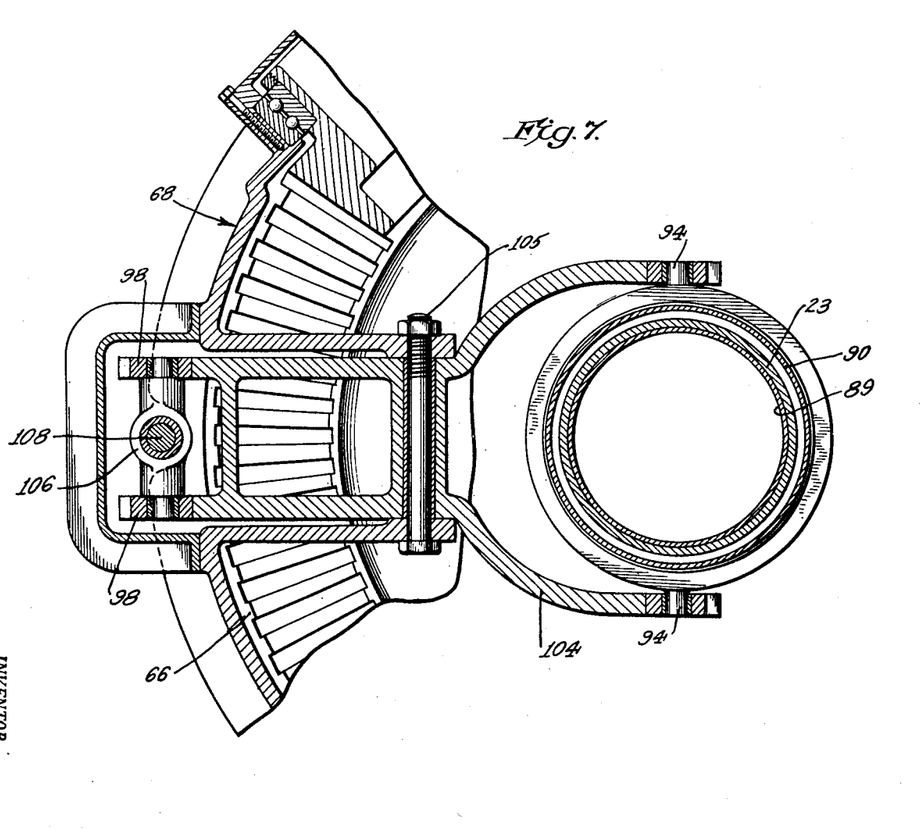
Figure 7 is a view in section, partly broken away, taken on line 7—7 of Figure 6.

Referring now to Figures 3, 6 and 7, the sleeve shaft 89 is provided with a raceway 91 for an anti-friction bearing 92 having an outer channel-like raceway 93. The collar 93 is pivotally connected by means of pins 94 thereon to the arms of a bifurcated lever 95. The lever 95 is pivotally supported on a pin 96 that is supported in the sidewalls of a hollow extension 97 from the casing 74 of the transmission. The opposite bifurcated end of the lever 95 is provided with slidable bearing blocks 98 that receive the ends of a member 99 having a centrally disposed threaded aperture 100 therein. The aperture 100 receives the lower threaded end 101 of a shaft 102 which extends slidably through the upper side of the casing 97 and into the lower portion of a casing 103 at one side of the transmission casing 68. Within the casing 68 is another lever 104 that is supported on a pivot pin 105 and has at its left-hand end bearing blocks similar to the blocks 98 for receiving pivotally the ends of a member 106 having a threaded central aperture 107. The threads of the aperture 107 are directed oppositely to the threads of the member 99 and receive the upper threaded end 108 of the shaft 102. Thus, upon rotation of the shaft 102, the levers 95 and 104 are rocked in opposite directions about their pivots. Upon endwise movement of the shaft 102, the levers 104 and 95 are rocked in the same direction about their pivots. These motions of the levers 95 and 104 are utilized to cause axial movement of the shafts 89 and 90. The lever 104 is connected to the shaft 90 in the same manner that the lever 95 is connected to the shaft 89.

Figure 4:
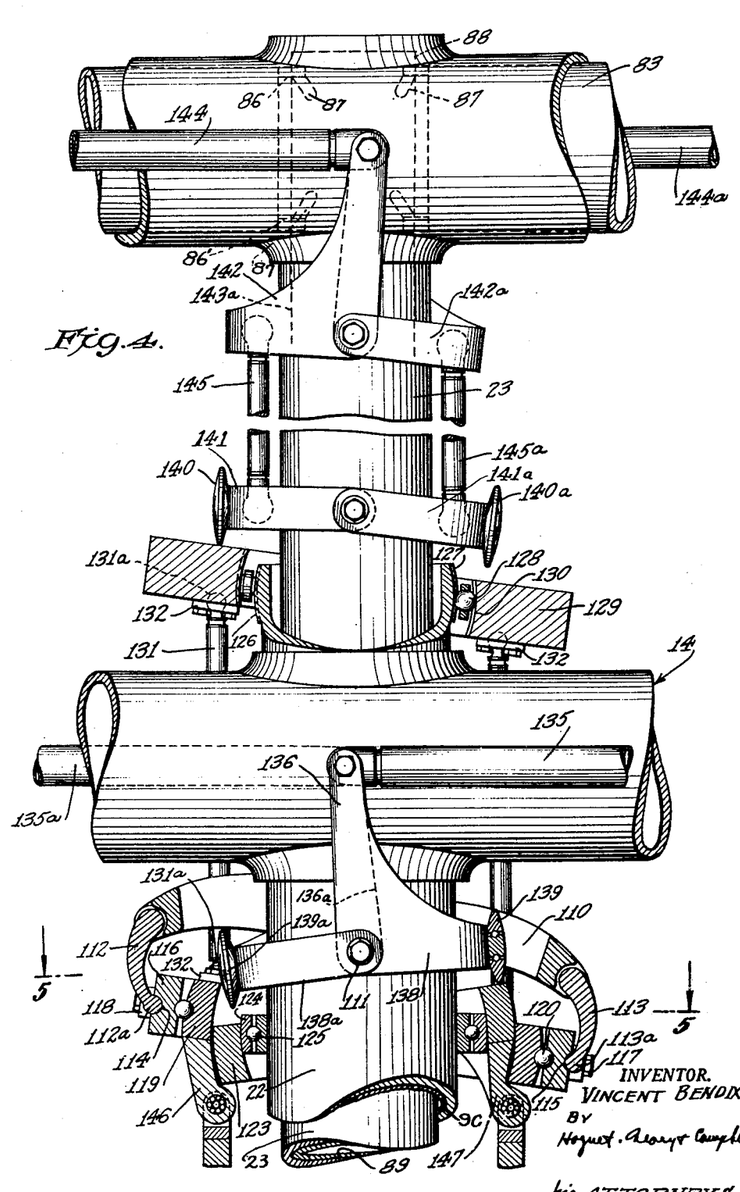
Figure 4 is a view in side elevation and partly broken away illustrating details of the cam ring mechanism for varying the sectional shape of the wings.
Figure 5:
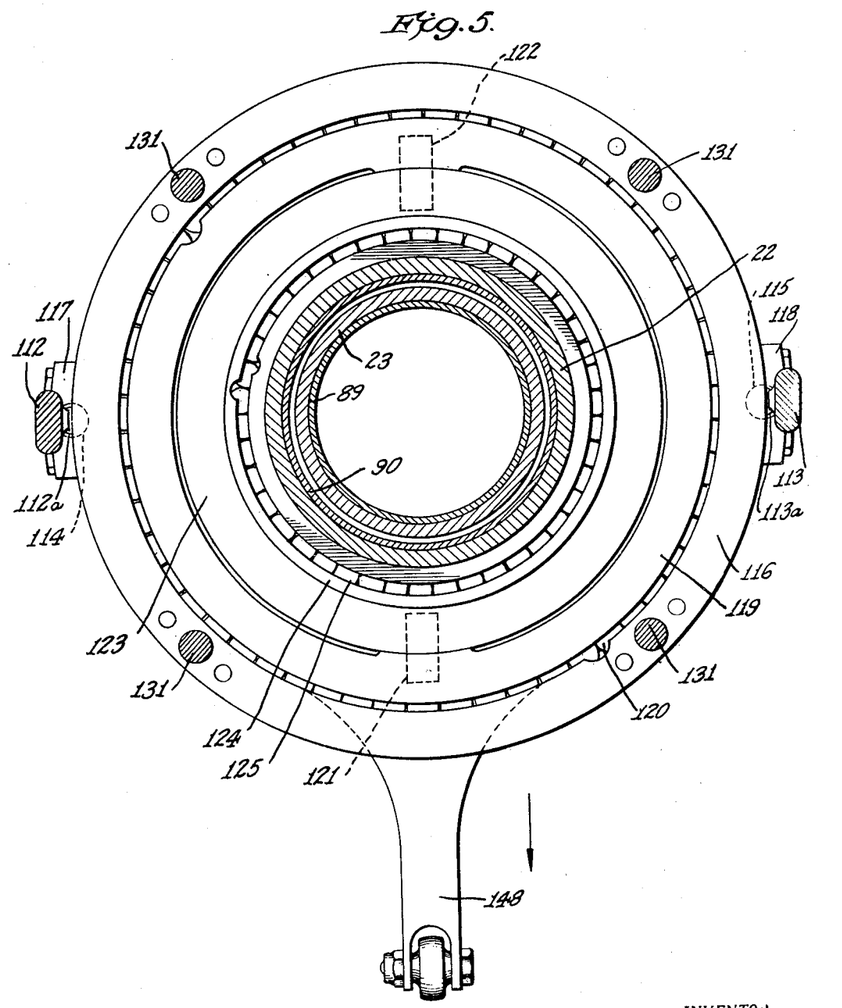
Figure 5 is a view in section taken on line 5—5 of Figure 4.

The propeller blades 84 are actuated and controlled by a mechanism now to be described and disclosed particularly in Figures 2, 4 and 5 of the drawings.

As best shown in Figures 2 and 4, the shaft 22 carries a yoke member 110 which is connected thereto by pivot pins 111 on opposite sides of the shaft 22. The yoke member 110 thus straddles or encircles the shaft 22 and rotates therewith. At opposite ends of the yoke member 110 are pivotally movable arms 112 and 113 which have ball-like lower ends 112a and 113a that engage in recesses 114 and 115 in a ring 116. The ball-like members, as shown in Figure 5, are retained in these recesses by means of clamping plates 117 and 118 that are provided with hemispherical recesses and are bolted to the exterior of the ring 116.

A second ring 119 is supported within the ring 116 by means of interposed ball bearings 120 so that these rings, while connected by the balls, are capable of relative rotation. The inner ring 119 is connected by means of the pivot pins 121 and 122 to a third ring 123 so that these rings are capable of rocking relatively to each other about their pivots.

The ring 123 in turn is supported for rocking movement on the outer race 124 of an anti-friction ball bearing 125 that is carried by the shaft 22. The adjacent surfaces of the rings 119, 123 and 124 may be curved semi-spherically.

At the upper end of the shaft 22 is formed a semi-spherical portion 126 which is provided with arcuate, vertically extending grooves 127 for receiving the balls 128. Supported by the balls 128 is a ring 129 also provided with grooves 130 for receiving balls so that the ring 129 will rotate with the shaft 22 and can rock relatively thereto. Between the ring 129 and the ring 116 extend a plurality of tie rods 131', each provided with ball-like upper and lower ends 131a which engage in a hemispherical recess in the rings 116 and 129 and are retained therein for relative universal movement by means of retaining plates 132. This arrangement causes the rings 116 and 129 to remain in absolute parallelism and to rotate with the shaft 22. When the ring 116 is disposed at an angle to the axis of the shaft, as illustrated in Figure 4, the ring 129 will assume this same angle. The inclination of the ring 129 and also the ring 116 can be changed in a manner presently to be described.

The inner ring 123 is utilized to control the movement of the propeller blades 84 of the lowermost rotor 14. In order to reciprocate the shaft 85 which controls the movement of the propeller blades, the shaft is connected by means of a cable 134 to the shaft 135 which has its inner end pivotally connected to the upper end of a lever 136 that is pivotally supported by means of the pivot pins 111 on the shaft 22. The lever 136 forms a portion of an arcuate yoke 138 that extends around the shaft 22. A similar relatively movable yoke 138a is supported on the pins 111 with its lever arm 136a disposed on the opposite side of the shaft 22 and connected to the rod 135a. Each of the yokes 138 and 138a is provided with a follower roller 139 and 139a, these rollers being adapted to cooperate with the upper surface of the ring 123 as the rotor 14 and the shaft 22 rotate. Thus, with the ring 123 in the angular position shown, the roller 139 is displaced upwardly, moving the shaft 135 to the left and projecting the propeller blade 84 at the righthand end of the rotor 14. Upon half a revolution, the roller 139a will assume the same position as the roller 139 and will project the propeller blade of the corresponding wing to the same extent and in the same arc of the circle of rotation.

The propeller blades of the upper and lower rotors 15 and 14 are arranged to be projected in corresponding arcs of their circles of rotation so that the torque reactions of the rotors normally are equalized. This is accomplished by means of the rings 123 and 129. It will be observed that, as shown, the ring 129 is inclined oppositely to the ring 123 in the adjusted position illustrated. Cooperating with the ring 129 are the rollers 140 and 140a which are supported on arcuate yokes 141 and 141a that are pivotally connected to the shaft 22 and rotate therewith. Above the yokes 141, 141a are the yokes 142 and 142a which are similar to the yokes 138 and 138a described above. The upper ends of the levers 143 and 143a are connected to the shafts 144 and 144a that are utilized for actuating the propeller blades of the upper rotor. The yoke 141 is connected to the yoke 142 by suitable tie rods 145 and the yoke 141a is connected to the yoke 142a by means of the tie rods 145a. Thus, upon rotation of the shaft 23, the yokes 142 and 142a are rocked by engagement of the rollers 140 and 140a successively with the cam ring 129.

The mechanism for regulating the angular position of the rings 129 and 123 will now be described.

As shown in Figure 4, the ring 119 is provided with a downwardly projecting lug 146 and the ring 123 is provided with a downwardly projecting lug 147. The lug 146 is directed inwardly, while the lug 147 is directed slightly outwardly so that these lugs are spaced equidistant from the axis of the shaft 22 when the rings 119 and 123 are in an horizontal position. The ring 119 is also provided with a forwardly directed rigid lever arm 148, as best shown in Figure 2 and 5. The lever arm 148 and the lugs 146 and 147 are used to tilt the rings in order to control and vary the operation of the propeller blades 84.

Figure 9:
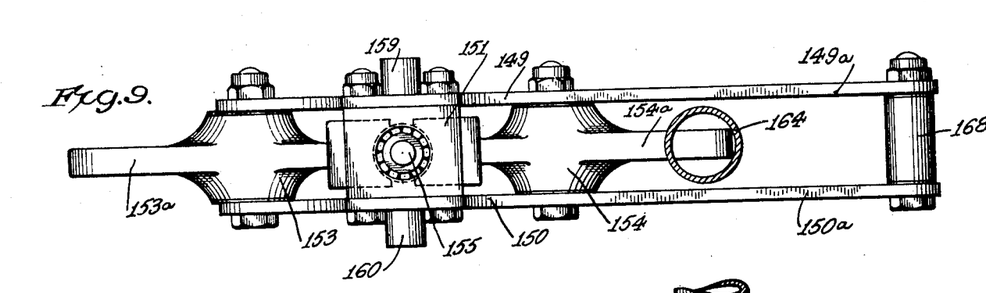
Figure 9 is a top plan view of a detail of the control mechanism.
Figure 10:
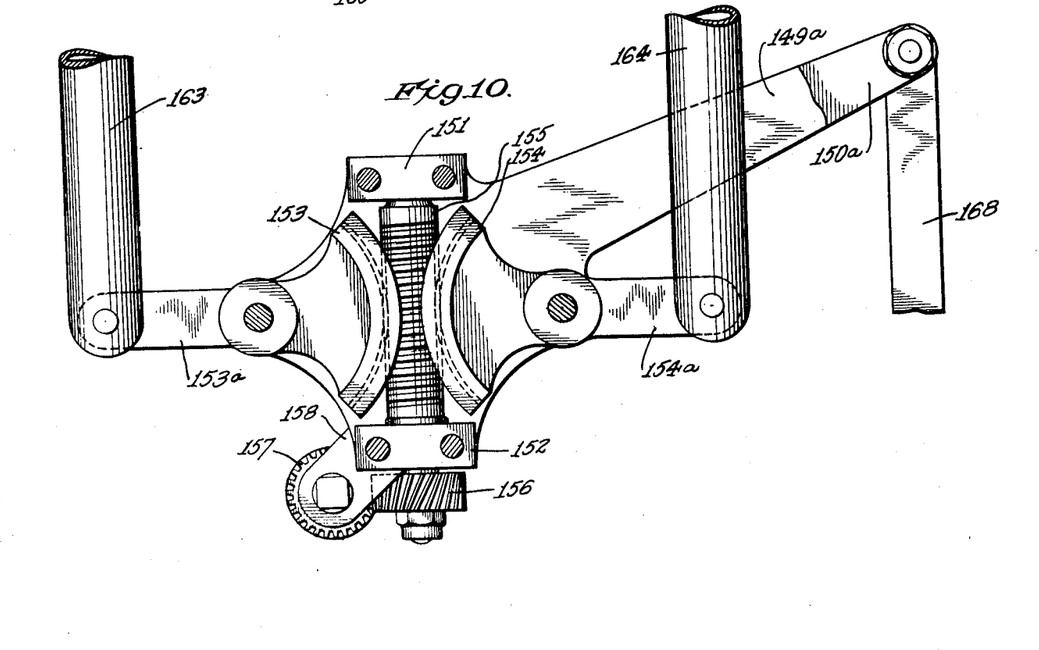
Figure 10 is a view in side elevation and partly broken away of the control mechanism of Figure 9.

The mechanism for rocking the two rings 119 and 123 about the pivot pins 121 and 122 is best shown in Figures 9 and 10 of the drawings. This mechanism includes a pair of spaced parallel plates 149 and 150 which are maintained in spaced apart relationship by suitable spacer blocks 151 and 152. Between the plates 149 and 150 are pivotally mounted a pair of gear sectors 153 and 154, each having a lever arm 153a or 154a projecting therefrom. The gear sectors 153 and 154 mesh with a worm 155 that is journaled in the blocks 151 and 152 and is provided at its lower end with a spiral gear 156. This gear meshes with another spiral gear 157 which is rotatably mounted in extensions 158 from the lower ends of the plates 149 and 150.

The unit described above is pivotally mounted on the front of the transmission housing 68, as shown in Figures 2 and 3, by means of the pins 159 and 160 projecting from the plates 149 and 150. The pin 159 is received in a boss or bearing 161 at the front of the housing 68, while the pin 160 is received in a similar bearing 162 formed by a plate extending up from the housing 68. Thus, the entire unit is capable of pivotal movement about the pivot pins 159 and 160.

The lever arms 153a and 154a are connected by means of suitable links 163 and 164 to the lugs 147 and 146, respectively. With this arrangement, when the gear 157 is rotated, the worm 155 is rotated, thereby rocking the gear sectors 153 and 154 about their pivots and moving the links 163 and 164 axially in the same direction. Inasmuch as these links are connected to the rings 119 and 123, these rings are rocked in opposite directions about the pivots 121, 122 (Figure 5).

Such equal rocking movement will result in equal displacement of the follower rollers 139, 139a and 140, 140a with the result that the propeller blades 84 on the wings will be projected cyclically through equal arcs during their rotation. By moving the links 164 and 163 upwardly, the propeller blades 84 are projected during their rearward movement to propel the helicopter forwardly. Rearward movement of the helicopter is attained by rocking the rings 119 and 123 to positions such that the propeller blades 84 are projected during forward movement of the wings of the rotors 14 and 15.

Sometimes it is desirable to project the propeller blades 84 unequal amounts in order to correct for rolling or to cause rolling of the helicopter about its longitudinal axis. When the rotor wings have their propeller blades projected unequally, the wing having a propeller blade projected to the greater extent, will have a greater lift and will tend to rise and tilt the helicopter. This variation in the projection of the propeller blades can be accomplished by means of the lever formed by the extensions 149a and 150a from the plates 149 and 150 (Figures 9 and 10). By rocking the entire assembly about the pivots 159, 160 by means of this lever, it is possible to vary the projection and retraction of the propeller blades 84.

The lever arm 148 (Figures 2 and 5) is used to cause the helicopter to pitch or to overcome pitching of the helicopter about its transverse axis. Thus, the lever arm 148 permits the ring system to be rocked bodily about a transverse axis at a right angle to the axis of the pins 121 and 122, thereby changing the angular relationship of the rings and causing the propeller blades 84 to be projected in either the rear or the forward sectors of their circle of rotation, as may be desired.

The control system for the helicopter includes a control stick 165 which is pivotally connected to the forward end of a shaft 166, as shown in Figure 2. The shaft is supported for rotation in suitable bearings (not shown) and is provided with a laterally projecting lever 167 that is connected by means of the link 168 to the lever formed by the arms 149a and 150a (Figures 9 and 10). Thus, upon rocking the lever 165 either right or left, the plate members 149, 150 are rocked either right or left with a corresponding change in the projection of the propeller blades 84.

The lever 165 is further loosely connected by means of a link 169 to a bell crank lever 170 which in turn is connected by means of a link 171 to the arm 148. Thus, upon forward movement of the control lever 165, the lever arm 148 is drawn downwardly with the result that the propeller blades 84 will be projected correspondingly in the rear sector of the circle of rotation. Movement of the control lever 165 to the rear moves the lever 148 upwardly, with the result that the propeller blades will be projected correspondingly in the forward sector of the circle of rotation and the helicopter will tend to pitch toward the rear.

The gear 157, which requires less adjustment, may be suitably connected by a flexible shaft 172 to a handwheel 173 adjacent the pilot's seat 174 (Figure 8) so that it can be adjusted to regulate the speed of the helicopter in a desired forward or reverse direction.

The helicopter is steered by means of a tiller bar 175 which is pivotally mounted on a support 176 (Figure 2) fixed to the floor of the helicopter. The tiller bar 175 is connected by a link 177 to a lever arm 178 that is keyed to the shaft 102 (Figure 6). Thus, upon movement of the tiller bar 175, the shaft 102 is rotated in such a direction as to vary the pitches of the rotors and by torque reaction to cause the helicopter to turn in the direction that the tiller bar is pushed forward. Thus, if the right-hand end of the tiller bar, looking forward, is pushed forward, the helicopter will turn to the right.

Figure 8:
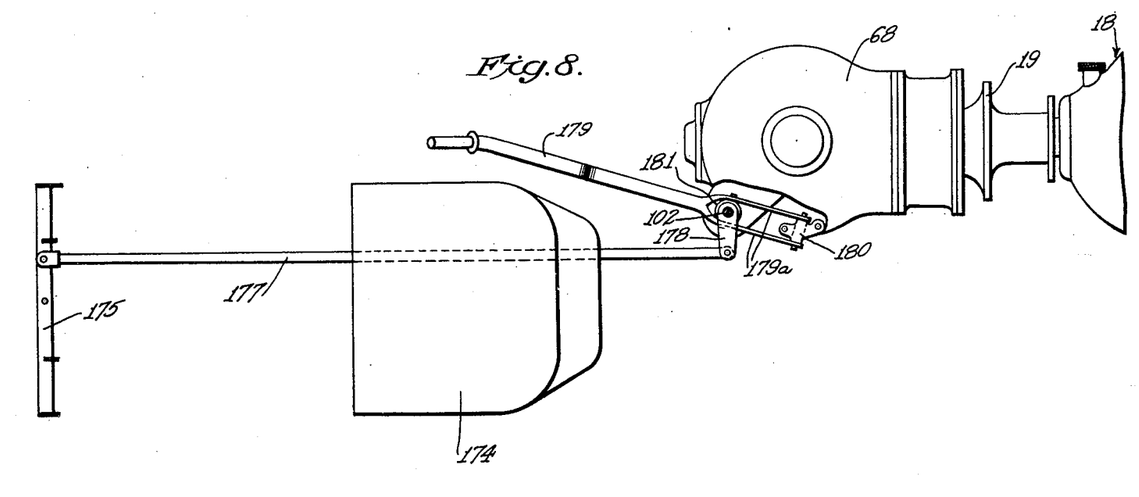
Figure 8 is a plan view, partly broken away, illustrating the controls of the helicopter and the relationship between the pilot's seat and the controls.

The helicopter is caused to ascend and descend by means of the ascent and descent control lever 179 (Figures 2 and 8). This lever has a bifurcated portion 179a, the ends of which are pivotally connected to a bracket 180 mounted on the housing 68. The bifurcated portion 179a straddles and is pivotally connected to a bearing ring 181 which is rotatably mounted on the shaft 102 (Figure 6). Upon upward movement of the control lever 179, the shaft 102 is moved upwardly, the pitch control sleeves 89 and 90 are moved downwardly and the pitch of the rotors is increased. Upon downward movement of the control lever 179, the pitch control sleeves 89 and 90 are raised and the pitch of the rotors is decreased.

The above-described control system, therefore, permits turning movements to be made by the operation of the tiller bar, pitching control of the helicopter by forward and reverse movements of the control lever 165, rolling movements of the helicopter by side to side movement of the lever 165, forward or reverse movement of the helicopter under the control of the handwheel 173 and rising and descending movements by means of the control lever 179. The effects of the various controls can be coordinated to regulate the speed and direction of movement of the helicopter. For example, the helicopter can be caused to ascend and descend by means of the control lever 179. If it is desired to cause the helicopter to move forward, the hand wheel 173 may be actuated to project the propeller blades 84 on the rotors 14 and 15 in arcs on opposite sides of the longitudinal center line of the helicopter. If greater speed is desired, the control lever 165 may be pushed forward causing the propeller blades 84 to be projected in the rearward arc of their rotation, and causing the rotational planes of the rotors to be inclined to the horizontal. After the rotors have assumed such an inclination, they will tend to draw the helicopter forwardly and the control lever can then be used to maintain the inclination of the rotors 14 and 15. In this position, the propeller blades may be used to overcome any tendency to pitch or roll and they may also contribute to the propulsion of the helicopter. Actually, when flying the helicopter by inclination of the rotors, the extent of the cyclical projection of the propeller blades 84 may be very small; that is, just enough to substantially equalize the lifts of the wings of the rotors in their advancing and receding arcs of movement and to overcome unwanted rolling or change in the inclinations of the rotors 14 and 15. In some cases, such as, for example, in the low speed range, the propeller blades 84 may be retracted fully, or used to control the pitching and rolling of the helicopter, only.

These operations can take place with the engine operative or inoperative, thereby affording positive control over the movements of the helicopter and increasing the safety of the helicopter in cases wherein landings without power are necessary.

The above-described helicopter construction presents a simplified control system, leaving primarily two controls to be operated, while in flight, thereby permitting less skilled operators to handle the device.

It will be understood that the controls can be modified and that ordinary foot pedals, for example, can be used instead of the tiller bar. Moreover, other connections may be made between the various control levers or sticks and the actuating and cam rings of the device and several of the rotor units can be interconnected to provide for greater load-carrying capacity. Therefore, the form of the invention described herein should be considered as illustrative and not as limiting the scope of the following claims.

I claim:

1. In a helicopter, the combination with counter-rotating, coaxial, multiple-wing rotors, means for varying the sectional shape of each rotor wing and cam followers connected to said means, of actuating mechanism for said followers to vary the shape of said wings cyclically comprising, an upper cam ring adjacent the upper rotor for engagement with the followers thereof, a lower cam ring adjacent the lower rotor for engagement with the followers thereof, means for rocking the lower cam ring about an axis in the plane of said lower cam ring, a member concentric with said lower ring, and pivotally and rotatably movable relatively thereto, and rotatable with said lower rotor, and means connecting said last mentioned member to said upper ring for rotation together in parallel planes.

2. In a helicopter, the combination with counter-rotating, coaxial, multiple-wing rotors, means for varying the sectional shape of each rotor wing and cam followers connected to said means, of members adjacent to and universally movable with respect to each rotor for engagement with the cam followers of the corresponding rotor, said members being centered on the rotor axis, means for moving one of said members to vary its inclination relatively to the axis of said rotors, another member adjacent to said one member, means supporting said another member for limited universal movement relatively to and for rotation with said one of said rotors, means for moving said another member to vary its inclination relatively to the axis of said rotors, and means connecting said another member and the member adjacent to the other rotor for simultaneous rotation in parallel planes.

3. In a helicopter, the combination with counter-rotating, coaxial, multiple wing rotors, means for varying the sectional shape of the rotor wings, movable followers connected to said means and a pair of concentric tubular shafts supporting said rotors; of a first ring member rotatably and rockably mounted on one of said tubular shafts for engagement with the followers of the rotor carried by the shaft, a second ring member axially spaced from said first ring member and rockably and non-rotatably mounted on said one of said shafts for engagement with the followers of the rotor of the other shaft, a third ring member supported by said first ring member and rotatable relatively thereto, means connecting said first and said third rings for pivotal movement relative to one another about an axis in their planes, means connecting said second and said third rings to maintain them in parallel planes, and means for rocking said first and said third rings relatively to each other to vary the amplitude of movement of said followers.

4. In rotating wing aircraft, the combination with a pair of concentric rotatable rotor shafts, a rotor mounted on each of said shafts and comprising a hub portion and a plurality of rotor wings projecting at fixed angles from said hub, of means for cyclically varying the sectional contour of the rotor wings without varying the pitch of said wings, comprising a control ring means connecting said control ring and the wings of one of said rotors, a second control ring, and means interconnecting said second control ring and the wings of the other rotor, said rings being pivotally connected and concentric with one another and with the rotor shafts, and means for rocking said rings relative to one another to shift the arc of actuation of the contour varying means of one rotor relative to that of the other.

5. In rotating wing aircraft, the combination with a pair of concentric rotatable rotor shafts, a rotor mounted on each of said shafts and comprising a hub portion and a plurality of rotor wings projecting at fixed angles from said hub, of means for cyclically varying the sectional contour of the rotor wings without varying the pitch of said wings, comprising a control ring concentric with said rotor shafts, means engageable with said control ring for controlling the cyclical variation of contour of the wings of one of said rotors, a second control ring concentric with and pivotally connected to said first ring, a third control ring axially spaced from the aforementioned control rings, means engageable with said third control ring for controlling the cyclical variations of contour of the wings of the other of said rotors, means for maintaining said third control ring parallel with said second control ring, and means for rocking said first and second rings relative to one another to shift the arc of actuation of the contour varying means of one rotor relative to that of the other.

6. In rotating wing aircraft, the combination with a pair of concentric rotatable rotor shafts, a rotor mounted on each of said shafts and comprising a hub portion and a plurality of rotor wings projecting at fixed angles from said hub, of means for cyclically varying the sectional contour of the rotor wings, comprising a control ring concentric with the axis of said shafts and supported for limited universal movement, means responsive to the direction and degree of inclination of said ring for cyclically varying the sectional contour of the wings of one rotor only, a second control ring concentric with and pivotally connected with said first mentioned ring, means responding to the direction and degree of inclination of said second ring for cyclically varying the sectional contour of the wings of the other rotor, means for setting said rings at selected angular relation to one another, and means for varying said setting.

7. In rotating wing aircraft, the combination with a pair of concentric rotatable rotor shafts, a rotor mounted on each of said shafts and comprising a hub portion and a plurality of rotor wings projecting at fixed angles from said hub, of means for cyclically varying the sectional contour of the rotor wings, comprising a control ring concentric with the axis of said shafts and supported for limited universal movement, means responding to the direction and degree of inclination of said ring for cyclically varying the sectional contour of the wings of one rotor only, a second control ring concentric with and pivotally connected with said first mentioned ring, a third ring concentric with said second ring and rotatable relative thereto in the same plane, a fourth ring concentric with the axis of said shafts but axially spaced from said aforementioned rings and supported for limited universal movement, means connecting said third and fourth rings for simultaneous rotation in parallel planes, means responsive to the direction and degree of inclination of said fourth ring and hence of said second ring for cyclically varying the sectional contour of the other rotor, means for setting said first and second rings at selected angular relation to one another, and means for varying said setting.

8. In rotating wing aircraft, the combination with coaxial counter-rotating rotors, each comprising a plurality of rotor wings, of a control ring concentric with the axis of said rotors and supported for limited universal tilting movement, means responsive to the direction and degree of tilting of said ring for cyclically varying the aerodynamic characteristics of the wings of one of said rotors, a second control ring concentric with said first mentioned ring, and pivotally connected therewith, means responsive to the direction and degree of tilting of said second ring for cyclically varying the aerodynamic characteristics of the wings of another rotor, means for setting said first and second rings in selected angular relation to one another, means for varying said setting, and means for tilting said rings in unison while maintaining the selected angular relation between them.

9. In rotating wing aircraft, the combination with a pair of concentric rotor shafts, means for rotating said shafts at equal speeds in opposite directions, and a rotor mounted on each of said shafts and comprising a plurality of rotor wings projecting at fixed angles from said hub, of means for non-cyclically varying the pitch of the wings of said rotors, means for cyclically varying the aerodynamic characteristics of the wings of each of said rotors in predetermined arcs of their circles of rotation without cyclically varying the pitch of said wings, and means for shifting the angular position of the arc of actuation of said characteristic varying means of one rotor relative to that of the other rotor.

10. In rotating wing aircraft, the combination with a pair of concentric rotor shafts, means for rotating said shafts at equal speeds in opposite directions, and a rotor mounted on each of said shafts and comprising a plurality of rotor wings projecting at fixed angles from said hub, of means for non-cyclically varying the pitch of the wings of said rotors, concurrently in the same direction and for non-cyclically varying the pitch of the wings of the individual rotors concurrently in opposite directions, means for cyclically varying the aerodynamic characteristics of the wings of each of said rotors in predetermined arcs of their circles of rotation without cyclically varying the pitch of said wings, and means for shifting the angular position of the arc of actuation of said characteristic varying means of one rotor relative to that of the other rotor.

11. In a helicopter, the combination with a pair of oppositely rotatable shafts, a multiple wing rotor mounted on each of said shafts in axially spaced relation and a movable member on each of the wings of said rotors for varying its sectional shape; of a tiltable member centered on the axis of said shafts and supported for limited universal movement relatively thereto, a follower member carried by each wing of one of said rotors engageable with said tiltable member and connected to the movable member of its corresponding wing for actuating said movable member, a second tiltable member centered on the axis of said shafts and connected to one of said shafts for rotation therewith and limited universal movement relatively thereto, a follower member carried by each wing of the other rotor engageable with said second tiltable member and connected to the movable member of its corresponding wing for actuating said last mentioned movable member, and means centered on the axis of said shafts and universally movable relatively thereto and connected in parallelism to said second tiltable member for rocking the latter relatively to said shaft with which it is connected.

12. In a control mechanism for helicopters, the combination with counter-rotating, multiple wing coaxial rotors and concentric, tubular shafts supporting said rotors in axial spaced relationship; of means for varying the lift of the rotor wings and means for cyclically actuating said lift varying means, including movable followers connected with said means, a pair of pivotally connected concentric rings rotatably supported on one of said shafts below the lower rotor, one of said rings engaging the followers of the lower rotor, means for rocking said rings relatively, a third ring rotatably mounted on the exterior of the outermost of said rings, means connecting the third ring to said one of said shafts for rotation therewith and pivotal movement with said outermost ring, a fourth ring between said rotors and engaging the followers of the upper rotor, and means connecting said third and fourth rings for rotation in parallel planes.

13. In a helicopter, the combination with a frame, a pair of oppositely rotatable coaxial shafts, a multiple wing rotor mounted on each of said shafts in axially spaced relation, of means for varying the lift of the rotor wings, a pair of pivotally connected rings, means for supporting the rings concentric with the rotor axis for tilting movement about axes in the planes of said rings, follower means responsive to the tilting of said rings for cyclically actuating said lift varying means, a member supported by said frame for pivotal movement, a pair of levers mounted on said member and projecting from opposite sides thereof, means connecting each lever to one of said rings, means for moving said levers simultaneously in the same direction, and means for rocking said member bodily about its pivot.

14. In rotating wing aircraft, the combination with counterrotating, coaxial, multiple wing rotors, a hollow shaft driving the lower rotor, a concentric shaft extending up through said hollow shaft and driving the upper rotor and means for varying the lift of the rotor wings, of a tiltable member centered on the axis of said shafts and supported for limited universal movement relative thereto, a follower member carried by each wing of one of said rotors engageable with said tiltable member and connected with said lift varying means of its corresponding wing for actuating said lift varying means, a second tiltable member centered on the axis of said shafts and connected to one of said shafts for rotation therewith and limited universal movement relative thereto, a follower member carried by each wing of the other rotor engageable with said second tiltable member and connected with the lift varying means of its corresponding wing for actuating said lift varying means, positive acting means for tilting said first and second tiltable members in opposite senses relative to one another and maintaining them in adjusted relation and means for tilting said members in unison in the same sense while maintaining their angular relation relative to one another.

15. In rotating wing aircraft, the combination of a pair of concentric rotatable rotor shafts extending one through the other, a rotor mounted on each of said shafts and comprising a hub portion and a plurality of rotor wings projecting at fixed angles from said hub, and means for varying the lift of the rotor wings, of a tiltable member centered on the axis of said shafts and supported for limited universal movement relative thereto, a follower member carried by each wing of one of said rotors engageable with said tiltable member and connected with said lift varying means of its corresponding wing for actuating said lift varying means, a second tiltable member centered on the axis of said shafts and connected to one of said shafts for rotation therewith and limited universal movement relative thereto, a follower member carried by each wing of the other rotor engageable with said second tiltable member and connected with the lift varying means of its corresponding means for actuating said lift varying means, positive acting means for tilting said first and second tiltable members in opposite senses relative to one another and maintaining them in adjusted relation and means for tilting said members in unison in the same sense while maintaining their angular relation relative to one another.

16. In rotating wing aircraft, the combination of a pair of concentric rotatable rotor shafts extending one through the other, a rotor mounted on each of said shafts and comprising a hub portion and a plurality of rotor wings projecting at fixed angles from said hub, means for cyclically varying the lift of each of said rotor wings while maintaining the pitch of the wings constant throughout the circle of revolution comprising a tiltable control ring, means interconnecting said control ring and the wings of one of said rotors, a second tiltable control ring, means interconnecting said second control ring and the wings of the other rotor, positive acting means for rocking said rings in opposite senses relative to one another and maintaining them in adjusted relation and means for tilting said rings in unison in the same sense while maintaining their angular relation relative to one another.

VINCENT BENDIX.

REFERENCES CITED

The following references are of record in the file of this patent:

UNITED STATES PATENTS

| Number | Name | Date |
|---|---|---|
| 1,449,129 | Pescara | Mar. 20, 1923 |
| 1,592,740 | Macneil | July 13, 1926 |
| 1,836,406 | Smith | Dec. 15, 1931 |
| 1,919,089 | Breguet et al. | July 18, 1933 |
| 2,271,473 | Bennett | Jan. 27, 1942 |

FOREIGN PATENTS

| Number | Country | Date |
|---|---|---|
| 695,918 | Germany | Sept. 5, 1940 |